US012384046B2

(12) United States Patent
Moyal et al.

(10) Patent No.: US 12,384,046 B2
(45) Date of Patent: Aug. 12, 2025

(54) ROBOTIC ASSISTANCE CONTINUITY USING PEDESTRIAN GAIT RECOGNITION

(71) Applicant: INTERNATIONAL BUSINESS MACHINES CORPORATION, Armonk, NY (US)

(72) Inventors: Shailendra Moyal, Pune (IN); Nitika Sharma, Zirakpur (IN); Akash U. Dhoot, Pune (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 17/650,878

(22) Filed: Feb. 14, 2022

(65) Prior Publication Data

US 2023/0256616 A1    Aug. 17, 2023

(51) Int. Cl.
*B25J 11/00* (2006.01)
*B25J 9/16* (2006.01)
*B25J 19/02* (2006.01)
*G06F 16/2457* (2019.01)
*G06V 40/10* (2022.01)
*G06V 40/20* (2022.01)

(52) U.S. Cl.
CPC .......... *B25J 11/008* (2013.01); *B25J 9/1682* (2013.01); *B25J 19/023* (2013.01); *G06F 16/2457* (2019.01); *G06V 40/10* (2022.01); *G06V 40/25* (2022.01)

(58) Field of Classification Search
CPC ...... B25J 9/1682; B25J 19/023; B25J 11/008; G06V 40/10; G06V 40/25; G06F 16/2457
See application file for complete search history.

(56) References Cited

U.S. PATENT DOCUMENTS

| 7,024,276 B2* | 4/2006 | Ito | G06N 3/008 |
| | | | 318/568.15 |
| 7,308,336 B2* | 12/2007 | Takenaka | B62D 57/02 |
| | | | 901/1 |
| 7,319,918 B2* | 1/2008 | Takenaka | B62D 57/032 |
| | | | 901/1 |
| 7,379,789 B2* | 5/2008 | Takenaka | B62D 57/032 |
| | | | 901/1 |

(Continued)

FOREIGN PATENT DOCUMENTS

JP    2019215840 A    12/2019

OTHER PUBLICATIONS

Papageorgiou et al., Hidden Markov modeling of human normal gait using laser range finder for a mobility assistance robot, 2014, IEEE, p. 482-487 (Year: 2014).*

(Continued)

*Primary Examiner* — McDieunel Marc
(74) *Attorney, Agent, or Firm* — Randy Tejeda

(57) ABSTRACT

A a method for robotic assistance continuity to a pedestrian using gait recognition. The method includes determining a gait pattern of the pedestrian based on analysis of visual data obtained at a first position. The pedestrian is provided assistance based on a query at the first position. The pedestrian is identified at a subsequent position by identifying the gait pattern from analysis of visual data obtained at the subsequent position. The need for additional pedestrian assistance is determined at the subsequent position.

20 Claims, 5 Drawing Sheets

(56) References Cited

U.S. PATENT DOCUMENTS

| | | | | |
|---|---|---|---|---|
| 7,386,364 | B2* | 6/2008 | Mikami | B62D 57/02 318/568.22 |
| 7,664,569 | B2* | 2/2010 | Shimizu | B62D 57/032 901/1 |
| 10,198,758 | B2 | 2/2019 | Qian | |
| 10,532,003 | B2 | 1/2020 | Yu | |
| 2020/0033135 | A1 | 1/2020 | Huh | |

OTHER PUBLICATIONS

Papageorgiou et al., Hidden markov modeling of human pathological gait using laser range finder for an assisted living intelligent robotic walker, 2015, IEEE, p. 6342-6347 (Year: 2015).*

Raman et al., Direction Estimation for Pedestrian Monitoring System in Smart Cities: An HMM Based Approach, 2016, IEEE, pg., (Year: 2016).*

Qintero et al., Pedestrian Path Prediction using Body Language Traits, 2014, IEEE, p. 317-323 (Year: 2014).*

Axente et al., "Gait Recognition as an Authentication Method for Mobile Devices", https://www.ncbi.nlm.nih.gov/pmc/articles/PMC7435811/, Aug. 2020; 20(15): 4110., pp. 1-19.

Chugh, "LG Airport Robot To Take Customer Service and Cleanliness To Next Level", LG Airport Robot To Take Customer Service and Cleanliness To Next Level https://www.reviewcenter.in/6324/lg-airport-robot-take-customer-service . . . , Jul. 25, 2017, pp. 1-7.

Http://www.europeancleaningjournal.com/magazine/web-articles/latest- . . . , "New LG Airport Robots Trialling In South Korea—ECJ", © European Cleaning Journal 2021, Aug. 18, 2017, p. 1.

Mell et al., "The NIST Definition of Cloud Computing", National Institute of Standards and Technology, Special Publication 800-145, Sep. 2011, pp. 1-7.

YouTube, "LG Airport Guide Robot at Press Conference—YouTube", https://www.youtube.com/watch?reload=9&app=desktop&v=rsrn4haUVEc, Jul. 21, 2017, pp. 1-3.

* cited by examiner

ROBOTIC ASSISTANCE CONTINUITY USING PEDESTRIAN GAIT RECOGNITION

BACKGROUND

Exemplary embodiments of the present inventive concept relate to robotic assistance continuity, and more particularly to robotic assistance continuity using pedestrian gait recognition.

Assistive robotic devices are increasingly being utilized in various types of public spaces (e.g., airports, train stations, malls, museums, etc.) to provide information to nearby pedestrians based on an interaction (e.g., a scanned document, explicit question, etc.). For example, a pedestrian traveller at an airport may check-in with a robotic device and the robotic device may provide them with a boarding pass containing information related to their trip (e.g., a flight time, terminal, flight number, gate, etc.) and directions.

However, a mobile pedestrian may interact with more than one assistive robotic device en route to a destination. Without any wearable identification device, subsequently encountered assistive robotic devices are unable to distinguish between mobile pedestrians who have migrated within a public space. Although facial recognition can be employed to identify mobile pedestrians, facial recognition may be intrusive and finer facial features can be difficult to discern from a distance and/or in motion, not to mention added difficulty when wearing facial coverings such as glasses or masks. Reidentifying a pedestrian by another assistive robotic device creates a time-consuming inefficiency in which each mobile pedestrian must repeat their previous interaction with subsequently encountered assistive robotic devices. Thus, robotic device assistance continuity based on the unique needs of each mobile pedestrian is compromised. This can be particularly problematic when a mobile pedestrian is in a rush (such as when a pedestrian traveller is rushing to catch their flight). Moreover, some mobile pedestrians may exhibit action inertia and resist approaching another assistive robotic device despite being lost, or they may be unable to locate another assistive robotic device in their vicinity.

SUMMARY

Exemplary embodiments of the present inventive concept relate to a method, a computer program product, and a system for robotic assistance continuity using pedestrian gait recognition.

According to an exemplary embodiment of the present inventive concept, a method for robotic assistance continuity to a pedestrian using gait recognition is provided. The method includes determining a gait pattern of the pedestrian based on analysis of visual data obtained at a first position. The pedestrian is provided assistance based on a query provided at the first position. The pedestrian is identified at a subsequent position by identifying the gait pattern from analysis of visual data obtained at the subsequent position. The need for additional pedestrian assistance is determined at the subsequent position.

According to an exemplary embodiment of the present inventive concept, a computer program product provides robotic assistance continuity to a pedestrian using gait recognition. The computer program includes one or more computer-readable storage media and program instructions stored on the one or more computer-readable storage media. The program instructions include a method. The method provides for robotic assistance continuity to a pedestrian using gait recognition. The method includes obtaining visual data of a pedestrian at a first position. A gait pattern of the pedestrian is determined based on the visual data from the first position. Pedestrian assistance is provided based on a pedestrian query at the first position. Visual data including the gait of the pedestrian is obtained at a subsequent position. A gait pattern based on the visual data from the subsequent position is determined. The pedestrian gait pattern from the first position and the subsequent position are matched, and a need for additional pedestrian assistance at the subsequent position is determined.

According to an exemplary embodiment of the present inventive concept, a computer system provides robotic assistance continuity to a pedestrian using gait recognition. The system includes one or more computer processors, one or more computer-readable storage media, and program instructions stored on the one or more of the computer-readable storage media for execution by at least one of the one or more processors. The program instructions include a method. The method for robotic assistance continuity to a pedestrian using gait recognition includes obtaining visual data of a pedestrian at a first position. A gait pattern of the pedestrian is determined based on the visual data from the first position. Pedestrian assistance is provided based on a pedestrian query at the first position. Visual data including the gait of the pedestrian is obtained at a subsequent position. A gait pattern based on the visual data from the subsequent position is determined. The pedestrian gait pattern from the first position and the subsequent position are matched, and a need for additional pedestrian assistance at the subsequent position is determined.

BRIEF DESCRIPTION OF THE DRAWINGS

The following detailed description, given by way of example and not intended to limit the exemplary embodiments solely thereto, will best be appreciated in conjunction with the accompanying drawings, in which.

Figure 1:
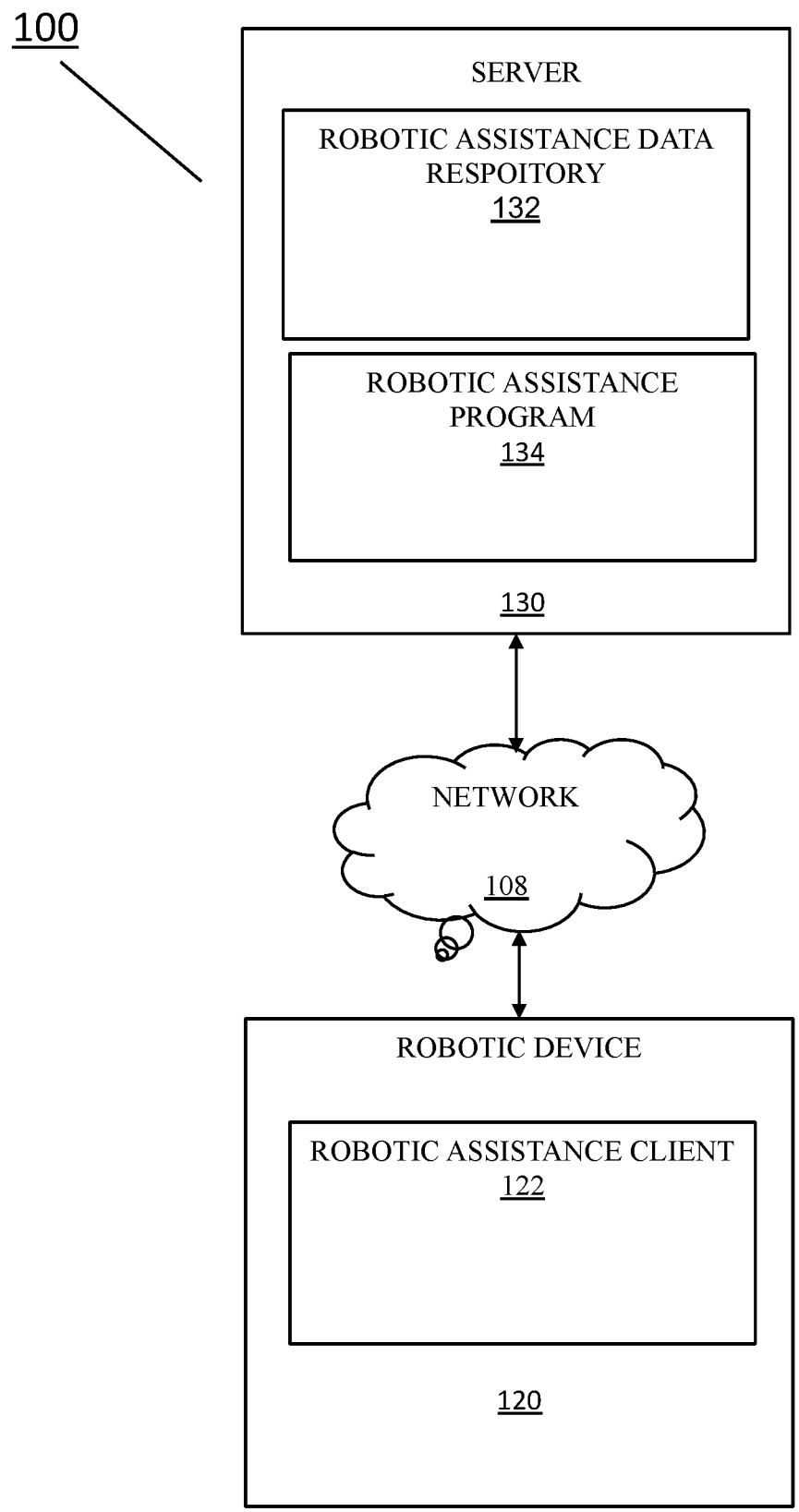
FIG. 1 illustrates a schematic diagram of a robotic assistance system 100, in accordance with an exemplary embodiment of the present inventive concept.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION OF THE DRAWINGS

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. It shall be understood that the following detailed description is focused on the distinctive features or elements of the present inventive concept according to various exemplary embodiments.

As referenced above, the present inventive concept pertaining to robotic assistance continuity using pedestrian gait recognition facilitates the identification of a mobile pedestrian which streamlines and proactively redresses their unique needs despite migration between areas.

FIG. 1 illustrates a schematic diagram of a robotic assistance system 100, in accordance with an exemplary embodiment of the present inventive concept.

The robotic assistance system 100 may include a network 108, a robotic device 120 and a robotic assistance server 130, which may be interconnected via the network 108. Programming and data content may be stored and accessed remotely across one or more servers via the network 108. Alternatively, programming and data may be stored locally on one or more physical computing devices 120.

The network 108 may be a communication channel capable of transferring data between connected devices. The network 108 may be the internet, representing a worldwide collection of networks 108 and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. The network 108 may be a Bluetooth network, a Wi-Fi network, or a combination thereof. The network 108 may operate in frequencies including 2.4 GHz and 5 GHz internet, near-field communication, Z-Wave, Zigbee, etc. The network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

The robotic device 120 may include a robotic assistance client 122. The robotic device 120 may be connected to an enterprise server, a laptop computer, a camera, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. The robotic device 120 may include a means of locomotion (e.g., a drone, a propeller, wheeled/treaded machine, etc.). The robotic device 120 may include software and/or hardware programs that may be configured to obtain visual data (e.g., images, time-lapse images, video, etc.) and/or audio data (e.g., speech). The robotic device 120 may be user operated, autonomous, or semi-autonomous and may include a means for identifying user gait patterns based on analyzed video footage. The robotic device 120 may include a user interface display (e.g., a touchscreen), LIDAR, a microphone and/or a speaker (e.g., to engage in conversation with a pedestrian, such as by questions and answers), a printer, storage compartments (e.g., for first-aid supplies, pedestrian personal items, tools useful for pedestrian assistance, etc.), and/or may be equipped with medical equipment or devices (e.g., a defibrillator, EpiPen, inhaler, etc.). Although the robotic device 120 is shown as a single device, the robotic device 120 may be comprised of a cluster or plurality of computing devices, in a modular manner, etc., working together or working independently. For example, the robotic assistance system 100 may include an ecosystem of robotic devices 120 connected centrally via the network 108. The robotic devices 120 in the robotic ecosystem may be mobile and/or stationary (e.g., a camera mounted on a wall, kiosk, etc.).

Figure 3:
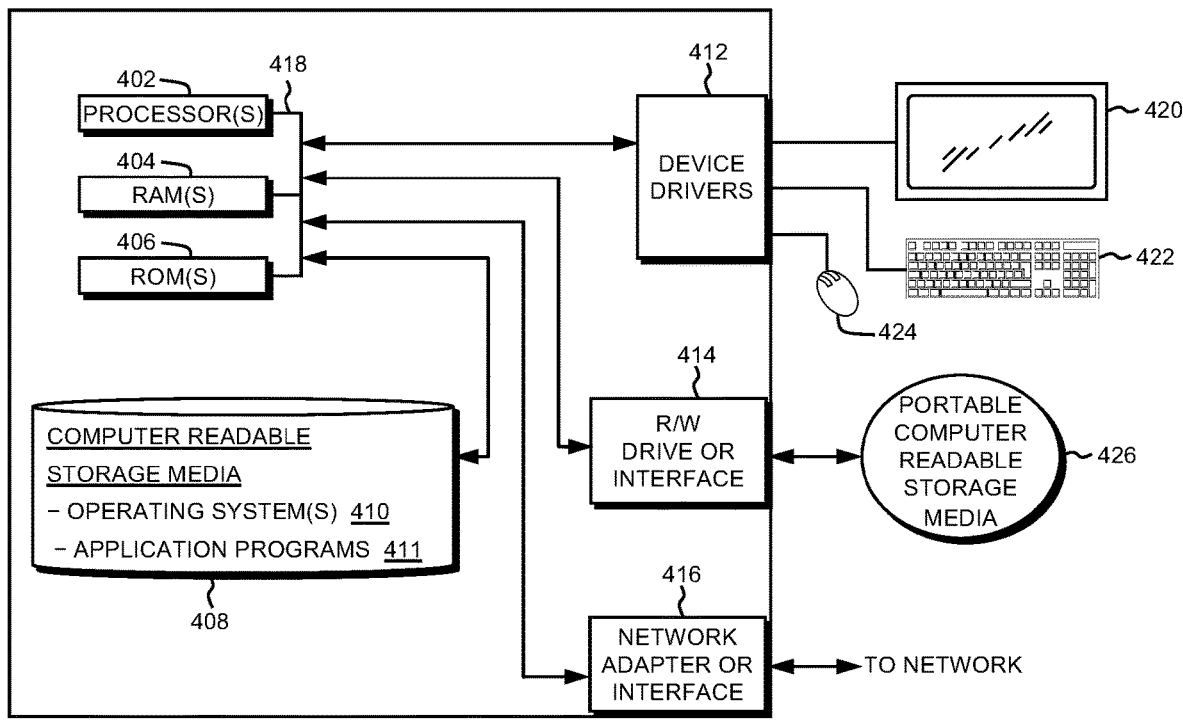
FIG. 3 illustrates a block diagram depicting hardware components of a robotic assistance system 100, in accordance with an exemplary embodiment of the present inventive concept.
Figure 4:
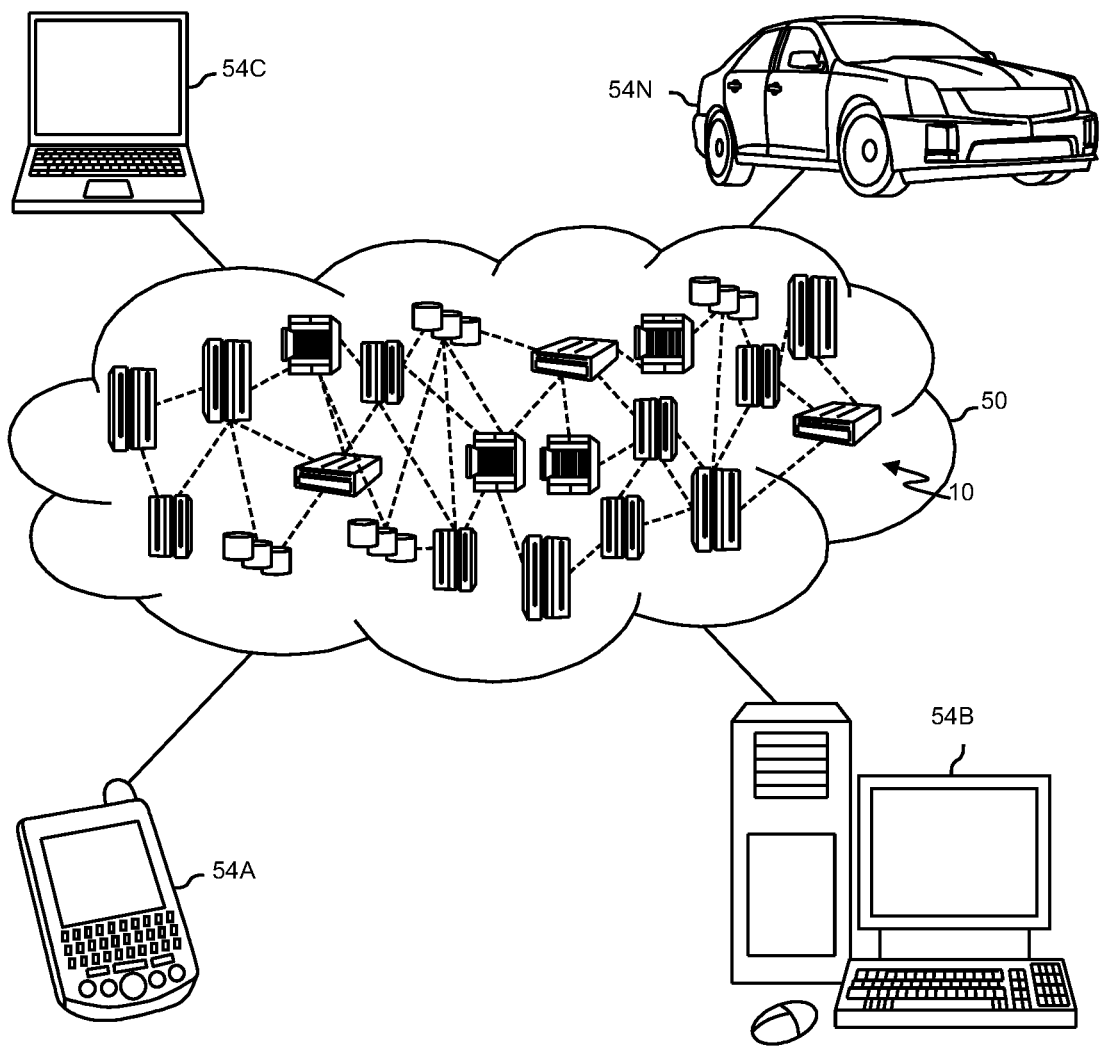
FIG. 4 illustrates a cloud computing environment in accordance with an exemplary embodiment of the present inventive concept.
Figure 5:
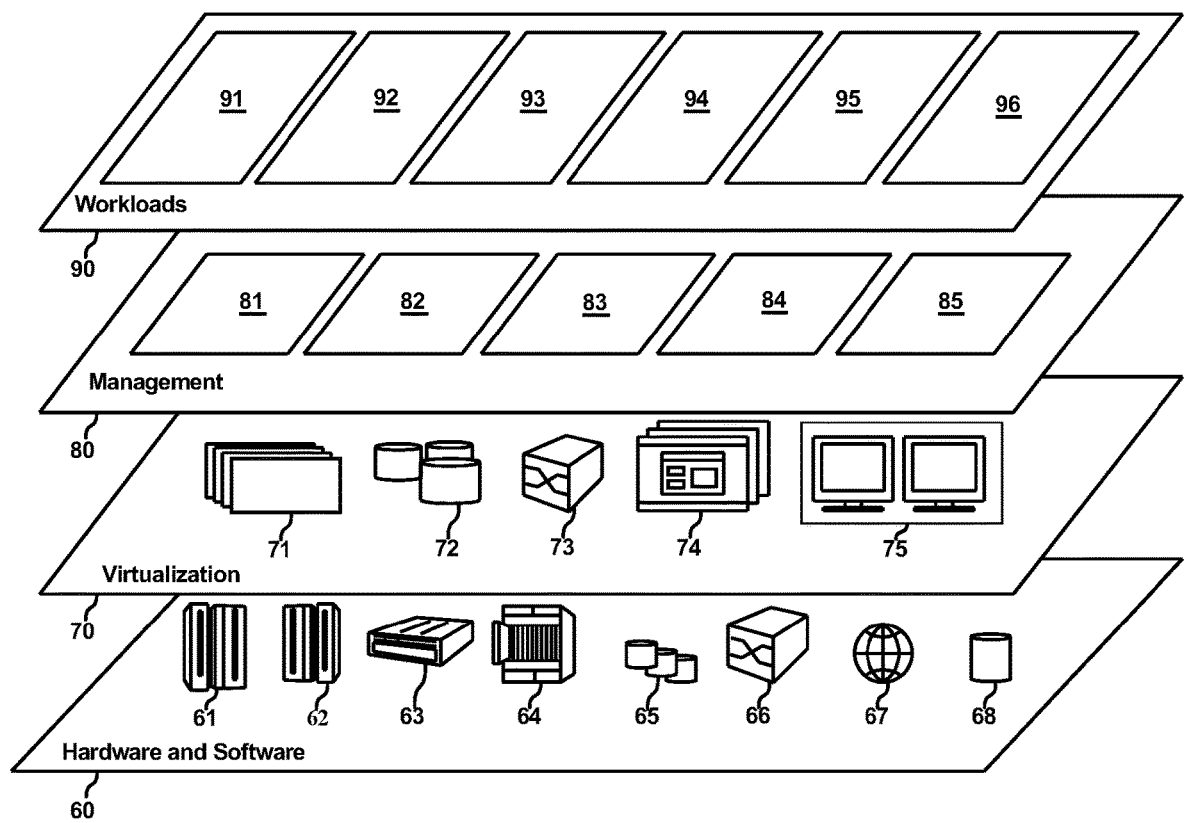
FIG. 5 illustrates abstraction model layers in accordance with an exemplary embodiment of the present inventive concept.

The robotic device 120 is described in greater detail as a hardware implementation with reference to FIG. 3, as part of a cloud implementation with reference to FIG. 4, and/or as utilizing functional abstraction layers for processing with reference to FIG. 5.

The robotic assistance client 122 may act as a client in a client-server relationship with a server (e.g., the robotic assistance server 130). The robotic assistance client 122 may exchange data with the robotic assistance server 130 and/or other computing devices (e.g., robotic devices 120) via the network 108. The robotic assistance client 122 may utilize various wired and wireless connection protocols for data transmission and exchange, including Bluetooth, 2.4 GHz and 5 GHz internet, near-field communication, etc.

The robotic assistance server 130 may include a robotic assistance data repository 132 and a robotic assistance program 134. The robotic assistance server 130 may act as a server in a client-server relationship with a client (e.g., the robotic assistance client 122). The robotic assistance server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices.

Although the robotic assistance server 130 is shown as a single computing device, the present inventive concept is not limited thereto. For example, the robotic assistance server 130 may be comprised of a cluster or plurality of computing devices, in a modular manner, etc., working together or working independently.

The robotic assistance server 130 is described in greater detail as a hardware implementation with reference to FIG. 3, as part of a cloud implementation with reference to FIG. 4, and/or as utilizing functional abstraction layers for processing with reference to FIG. 5.

The robotic assistance data repository 132 may store data (e.g., audio recordings, visual recordings, pedestrian gait patterns, pedestrian positions (i.e. first, and subsequent), substance of pedestrian interactions, scannable item contents, and/or previously given pedestrian assistance (e.g., instructions).

The robotic assistance program 134 may obtain visual data of at least one pedestrian and determine whether or not a corresponding gait pattern is recognized via visual data analysis. According to an exemplary embodiment of the present inventive concept, speech recognition may be used alternatively, or in addition to gait pattern recognition (e.g., to reinforce/confirm a pedestrian's identity from gait recognition, or at subsequent positions when the pedestrian is idle but appears to require assistance). If a pedestrian gait pattern is recognized, then additional assistance may be provided to the pedestrian as needed. The robotic assistance program 134 may transmit the pedestrian gait patterns, positions, and given assistance to the robotic assistance data repository 132 for storage. The robotic assistance program 134 may read from (and write to) the robotic assistance data repository 132. The robotic assistance program 134 may retrieve stored audio data, visual data, pedestrian gait patterns, pedestrian positions (first and subsequent), substance of pedestrian interactions, scanned item contents, and/or given pedestrian assistance (e.g., instructions) from the robotic assistance data repository 132. If a pedestrian gait pattern is not recognized, the robotic assistance program 134 may wait until a pedestrian interaction is received and assist accordingly. Upon an interaction, the robotic assistance program 134 may also determine a pedestrian's position (e.g., using a global positioning system (GPS)), and process scanned item contents, interactions (e.g., queries), visual data and audio data received from the robotic device 120 using artificial intelligence (e.g., perform gait pattern analysis, speech analysis, analysis of writing, etc.).

Figure 2:
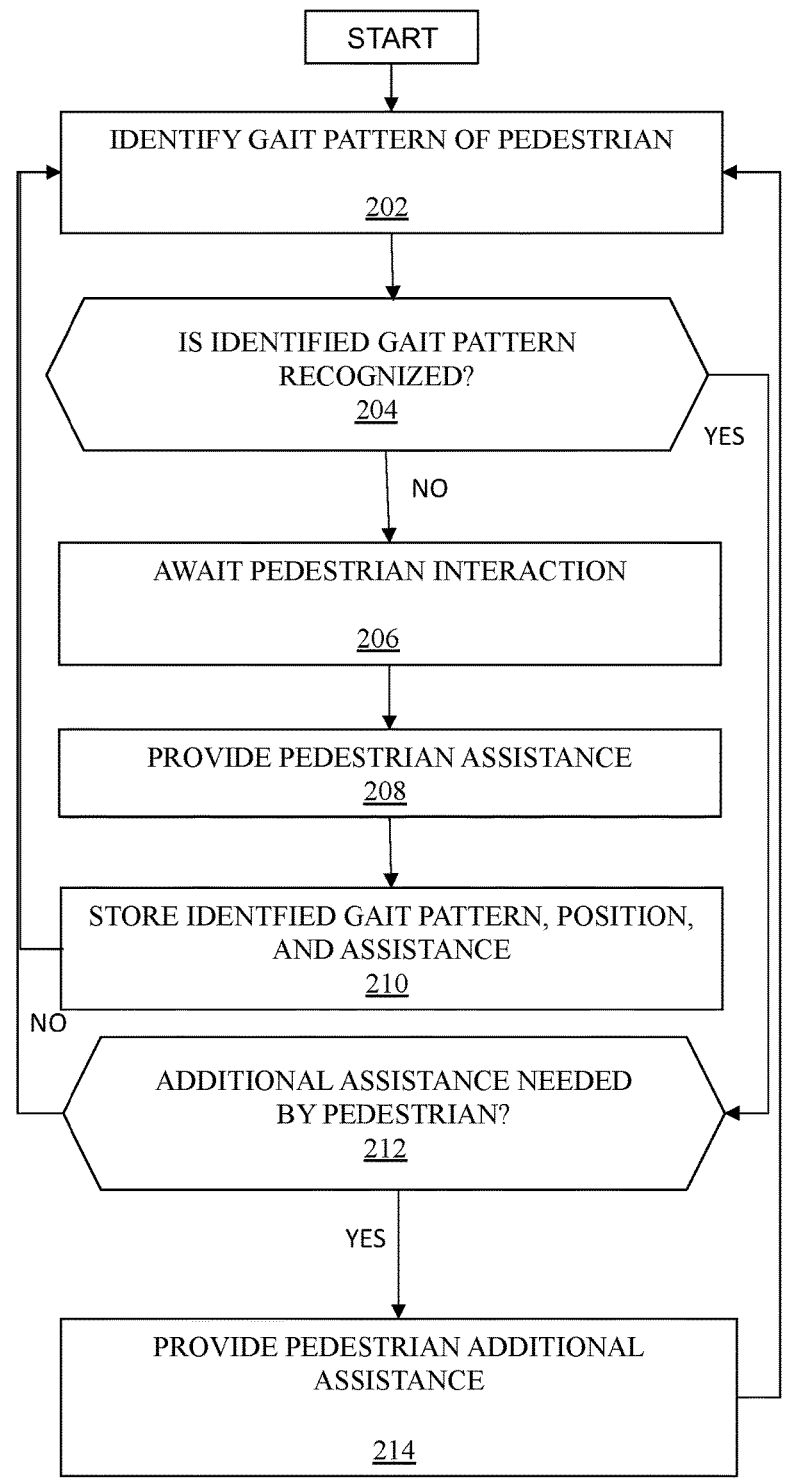
FIG. 2 illustrates a flowchart 200 depicting a robotic assistance program 134 of the robotic assistance system 100, in accordance with an exemplary embodiment of the present inventive concept.

FIG. 2 illustrates a flowchart depicting robotic assistance 200, in accordance with an exemplary embodiment of the present inventive concept.

The robotic assistance program 134 may identify a gait pattern of a pedestrian (step 202). The robotic assistance program 134 may identify the gait pattern of one or more pedestrians by obtaining camera footage of the one or more pedestrians in motion. The camera footage may be pre-recorded or taken in real time. The camera footage may depict the gait of one or more pedestrians ambulating. In an exemplary embodiment, the robotic assistance program 134 may constantly obtain camera footage of all pedestrians within view of a robotic device 120. The pedestrians' gaits may be analysed for respective gait patterns. In an exemplary embodiment, the robotic assistance program 134 may obtain camera footage pursuant to one or more triggers, such as a pedestrian interaction (e.g., scanning of an item, asking for assistance, a pedestrian gesture to the robotic device 120 (such as waving or beckoning), etc.), a proximity radius (e.g., using LIDAR or proximity detection sensors), a pedestrian trajectory (heading towards the robotic device 120) and/or an orientation of the pedestrian relative to the robotic device 120 (approaching in a forward-facing manner). If multiple pedestrians are talking at once and/or occupying a same area when a request for assistance is made, the robot assistance program 134 may discriminate between the pedestrians via audio and visual analysis (e.g., directional associations, body orientation, body movements such as lip or hand movements, etc.) to determine which is the requester and assist accordingly.

The robotic assistance program 134 may identify the pedestrian gait pattern by applying one or more gait analysis techniques to the camera footage of the pedestrian's gait. Such gait analysis techniques may involve the use of artificial intelligence (e.g., a convolutional neural network (CNN)) configured to perform gait pattern analysis.

For example, automatic gait pattern recognition may rely on the symmetry of walking cycles. Image filters (grayscale and the Sobel operator for edge detection) are applied to the frames of the video to extract the silhouette of the person and then the outline. Symmetry is computed based on the midpoints of the sectors defined by the points on the outline. Another visual approach is the use of computer vision including a classifier. An example of such a classifier explores the possibility of identifying gait patterns by constructing both a motion model and a structural model of the thigh. The model is similar to a pendulum, with the hip acting as a pivot and the knee acting as the weight. However, the present inventive concept is not limited thereto. For example, identifying gait patterns may also encompass the articulated movements, dimensions, and relative positions of the arms, torso, and head during ambulation. Differences or similarities in gait pattern characteristics may be used to distinguish or match pedestrian gait patterns accordingly.

The robotic assistance program 134 may further note the position) of a pedestrian after an interaction and/or after a gait pattern has been recognized. The robotic assistance program 134 may identify the pedestrian's position using various positioning techniques. For example, GPS location of the robotic device 120 may be used to determine a pedestrian's position at the time an interaction occurs. The robotic assistance program 134 may estimate the pedestrian's relative position (e.g., to a robotic device 120 before, during, or after an interaction) by applying visual ranging techniques to visual data to estimate a distance to the pedestrian. With the use of multiple robotic devices 120, positioning techniques (e.g., trilateration and triangulation) may be used. Such techniques may be particularly beneficial for stationary robotic devices 120 which may be located at a considerable distance from the pedestrian. The identified gait pattern of the one or more pedestrians as well as positions thereof may be stored within the robotic assistance repository 132.

To illustrate the operations of the robotic assistance program 134, reference is now made to an illustrative example in which an ecosystem of the robotic devices 120 is implemented to identify the gait patterns of travellers at an airport that are within camera view. However, the present inventive concept is not limited thereto. For example, robotic assistance 200 may be implemented within various environments frequented by pedestrians (e.g., such as a movie theatre, mall, park, etc.).

The robotic assistance program 134 may determine whether the identified pedestrian gait pattern is recognized (decision 204). In an exemplary embodiment, the robotic assistance program 134 may determine whether the identified pedestrian gait pattern matches a previously stored gait pattern to determine whether the pedestrian has previously engaged in an explicit query or an acknowledged implicit query. The robotic assistance program 134 may determine whether the gait pattern is recognized by comparing the identified gait pattern to previously identified gait patterns stored within the robotic assistance repository 132.

For example, using the airport example, the robotic assistance program 134 may compare the identified gait patterns of the travellers within view at the airport to the identified gait patterns already stored within the robotic assistance repository 134.

If the identified gait pattern is not recognized by the robotic assistance program 134 (decision 204, "NO" branch), then the robotic assistance program 134 may await a pedestrian interaction (step 206). The pedestrian interaction may be an explicit query (e.g., conveyed verbally and/or by manual entry via an interactive touchscreen display), or an implicit query. Implicit queries may include pedestrian presentation of an item, such as a scannable item (e.g., barcode, ticket, QR code, text, etc.), to a robotic device 120, as well as analysis of pedestrian body language and/or speech conveying a need for pedestrian assistance (e.g., verbal, or bodily indications of being in distress, lost, anxious, frustrated, etc.). The robotic assistance program 134 may analyse the pedestrian's body language using artificial intelligence techniques (e.g., a convolutional neural network (CNN)). The pedestrian's speech may be analysed (e.g., converted to text and analysed using artificial intelligence NLP. The text of a scanned item may be subjected to natural language processing (NLP). Predetermined audio/visual/textual features (e.g., predetermined keywords and patterns of body language) associated with the need for assistance may form the basis for implicit query determination. In the case of receiving a pedestrian interaction via a pedestrian's implicit query, a nearby robotic device 120 may first ask the pedestrian whether they need assistance before providing directions. To do so, the robotic device 120 may travel to the pedestrian if they are outside of a predetermined speaking range. Accuracy of implicit query determinations may be evaluated using confidence scores.

Continuing the airport example, a traveller that arrives at the airport may interact with a robotic device 120 positioned at an entrance thereof, and the robotic device 120 may scan a traveller provided flight itinerary. The robotic device 120 may then determine that the traveller has an implicit query for a boarding pass and directions to the flight gate and terminal, whether or not the traveller also conveys these needs verbally. The robotic device 120 may proceed to confirm that the traveller requires directions to their destination and a printed boarding pass.

The robotic assistance program 134 may provide pedestrian assistance (step 208). The robotic device 120 may provide pedestrian assistance that is responsive to the pedestrian's implicit query (if their need for assistance is acknowledged) and/or explicit query. Pedestrian assistance may include contacting third parties for further assistance (e.g., first responders, employees, etc.), providing instructions to a nearby individual (e.g., the pedestrian) to perform a task, rendering functional aid (e.g., using a pole arm to grab an item out of reach, performing first-aid techniques such as defibrillation and compressions, etc.), escorting the pedestrian, and/or giving directions (e.g., to a particular destination, item, or individual).

In the case of directions, the robotic device 120 may provide pedestrian assistance by speaking, displaying a map (e.g., GPS route) on a display screen (e.g., an integrated display screen, a display screen of a nearby stationary robotic device 120, and/or a display screen of the pedestrian's mobile device), printing/displaying map or list-based instructions, projecting the map or list-based instructions onto a nearby surface, and/or using a series of ground lights or the like connected to the network 108 to illuminate a route. The directions from the robotic device 120 may reference landmarks, features (e.g., signs, directories, stations, etc.), and/or units of distance. Multimedia from external computer devices and/or the internet that may have implications for an object of the pedestrian's query (e.g., delays, hazards, etc.) may be retrieved via the network 108 and subjected to NLP and/or CNN. The robotic device 120 may then inform the pedestrian of changes at a destination (e.g., delays, safety hazards, etc.) when providing pedestrian assistance.

For example, the robotic device 120 may print the boarding pass and direct the traveller to take a left from the airport entrance and walk for 200 feet to a TSA checkpoint before proceeding straight ahead, and then to take an escalator upstairs to gate 31, terminal 2 for flight number 5134, with an original time of arrival of 3:45 pm. In addition, the robotic device 120 may access recent airline weather delays via the network 108 indicating a breaking 1-hour delay to the traveller's flight and may inform them of the adjusted departure time of 4:45 pm accordingly.

The robotic assistance program 134 may store the pedestrian's identified gait pattern, position, and assistance in the robotic assistance data repository 132 (step 210). Stored data may further include any other information relevant to an object of the pedestrian's query/interaction and/or the pedestrian themselves.

For example, the robotic assistance program 134 may write to the robotic assistance data repository 132 with the traveller's identified gait pattern and their appropriate terminal (2), flight number (5134), time of departure (4:45 pm), gate (31), first position (airport entrance), and directions (to take a left from the airport entrance and walk for 200 feet to a TSA checkpoint before proceeding straight ahead, and then take an escalator upstairs to gate 31, terminal 2). Thus, the traveller's distinctive identified gait pattern is correlated with their position at the airport entrance, travel information, and provided directions. Thus, when the traveller's gait is recognized further into the interior of the airport, continuity of assistance may be provided as required.

After storing the pedestrian's identified gait pattern, position, and given assistance, the robotic assistance program 134 may return to identifying the gait patterns of pedestrians (step 202). In an exemplary embodiment, the robotic assistance program 134 may return to identifying pedestrian gait patterns in a similar manner to that described above within the same location or at a subsequent location within the environment (e.g., during a patrol route).

If the robotic assistance program 134 determines that the pedestrian gait pattern is recognized (decision 204, "YES" branch), then the robotic assistance program 134 may determine whether additional assistance is needed by the pedestrian (decision 212).

If the pedestrian interaction was an explicit query for assistance, then the flowchart may proceed to step 214. Otherwise, a nearby robotic device 120 may determine whether the pedestrian requires additional assistance based on a comparison of the previous assistance provided with the pedestrian's compliance, deviation, and/or progress towards that goal. If the initial assistance was provided directions, then the robotic assistance program 134 may preliminarily determine whether or not the pedestrian requires additional assistance based on their trajectory and/or a physical and/or temporal deviation from the directions. Deviation beyond the predetermined thresholds may be acceptable given predetermined situational contexts (e.g., a pedestrian getting food, shopping, entering a restroom, etc.).

The robotic assistance program 134 may analyse the situational context by extracting features from the audio and/or visual data of the gait recognized pedestrian at the subsequent position and/or may retrieve stored information to evaluate their need for additional assistance. Audio and/or video data may be analysed by the NLP and/or the CNN respectively. Whether the situational context calls for initiating interaction with the pedestrian (e.g., notifying the pedestrian and/or asking whether they need additional assistance) may depend on a variety of factors, such as whether the deviation and/or the wrong trajectory is inferred to be related to an intentional detour (e.g., at or headed toward a nearby bathroom, food court, store, etc.), accompanied by certain triggers at the most recent subsequent location (e.g., speech and/or body language indicative of being lost, distressed, etc.), the occurrence of an emergency, event timing (started/is about to start/is about to end), the pedestrian's calculated ETA is insufficient to arrive during the event timing, etc.), and/or involves certain activities (e.g., window shopping, standing for a beverage, resting, having conversation with another individual, etc.). Common detour zones may be demarcated on the GPS map of the robotic assistance program 134.

The robotic assistance program 134 may calculate whether the pedestrian's walking velocity will permit the pedestrian to make a time/destination indicated on a scanned item (e.g., a scannable item) or determined from the pedestrian interaction at the first position. The robotic assistance program 134 may calculate the pedestrian's walking velocity based on the amount of time taken by the pedestrian to travel between the first and at least one subsequent position. The walking velocity calculation may also consider gait abnormalities detected during gait pattern analysis indicative of difficulty with ambulation (e.g., arthritis). If the robotic assistance program 134 determines that the pedestrian at the subsequent location has moved outside of a predetermined boundary (e.g., left the public space, boarded a vehicle, etc.) and/or a predetermined amount of time has elapsed (e.g., the outer bound of an event time has passed) it may purge corresponding information from the robotic assistance data repository 132.

For example, if the gait recognized traveller is observed to be eating at the food court at 3:45 pm, the nearby robotic device 120 at the subsequent location will not interrupt the traveller because there is no emergency, their flight is delayed an hour (departs at 4:45 pm), and their calculated walking velocity is sufficient to arrive at gate 31 terminal 2 in time. However, if the traveller leaves the airport entrance, boards the flight, or misses boarding, then the robotic assistance program 134 may purge the traveller's stored data.

If the robotic assistance program 134 determines that additional assistance is needed by the pedestrian (decision 212, "YES" branch), then the robotic device 120 may provide the pedestrian additional assistance (step 214). The robotic device 120 at the subsequent location may intercept/engage the pedestrian to inquire whether they need pedestrian assistance and/or to inform them about a deviation, non-compliance, lack of progress towards the goal, and/or other information relevant to their query (e.g., an improper trajectory to their destination, changes to an event time, etc.). If an emergency is apparent, additional assistance may be provided even if confirmation cannot be obtained. In the case of directions, updated directions to the destination may be provided to the pedestrian relative to their most recent subsequent position (e.g., using GPS). The robotic device 120 at the subsequent position may escort the traveller to their destination either by travelling alongside them or by acting as a vehicle for their transportation. The robotic assistance program 134 may convey a projected late arrival of the pedestrian to appropriate parties at an event site either indirectly (e.g., communicating with a robotic device 120 positioned near the destination) or directly (e.g., to an event site computer device over the network 108 or by travelling thereto).

For example, the robotic device 120 that recognized the traveller at the food court may again observe them lingering at 4:25 pm (flight boarding) from their identified gait pattern. The robotic device 120 may approach the traveller to inform them that their flight is boarding and will leave in 20 minutes. If the traveller's calculated walking velocity is insufficient to arrive during the boarding process, the robotic device 120 may also provide them with transportation to terminal 2 gate 31.

According to an exemplary embodiment of the present inventive concept, the robotic assistance program 134 may triage pedestrians that are within a trigger radius for assistance based on the ranked urgency of their needs (e.g., an emergency, time remaining to an event, degree of deviation, etc.). This triage decision may be conveyed to the robotic device 120 at the subsequent location, and the robotic device 120 may provide pedestrian assistance accordingly (e.g., transport, defibrillation, chest compressions, access to compartment housed first-aid supplies, directions to medics, a nearest exit, law enforcement, etc.). When multiple high priority pedestrian needs require assistance simultaneously, mobile robotic devices 120 from other zones may be mobilized and assigned tasks.

FIG. 3 illustrates a block diagram depicting hardware components used in the robotic assistance system 100 of FIG. 1, in accordance with an exemplary embodiment of the present inventive concept.

It should be appreciated that FIG. 3 provides only an illustration of one implementation and does not imply any limitations with regard to the environments in which different embodiments may be implemented. Many modifications to the depicted environment may be made.

Devices used herein may include one or more processors 402, one or more computer-readable RAMs 404, one or more computer-readable ROMs 306, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a RAY drive or interface 414 to read from and write to one or more portable computer readable storage media 426. Application programs 411 on said devices may be stored on one or more of the portable computer readable storage media 426, read via the respective RAY drive or interface 414 and loaded into the respective computer readable storage media 408.

Devices used herein may also include a network adapter or interface 416, such as a TCP/IP adapter card or wireless communication adapter (such as a 4G wireless communication adapter using OFDMA technology). Application programs 411 on said computing devices may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Devices used herein may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific one of the exemplary embodiments. However, it should be appreciated that any program nomenclature herein is used merely for convenience, and thus the exemplary embodiments should not be limited to use solely in any specific application identified and/or implied by such nomenclature.

FIG. 4 illustrates a cloud computing environment in accordance with an exemplary embodiment of the present inventive concept.

It is to be understood that although this disclosure includes a detailed description on cloud computing, implementation of the teachings recited herein are not limited to a cloud computing environment. Rather, the exemplary embodiments of the present inventive concept are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As shown, cloud computing environment 50 may include one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

FIG. 5 illustrates abstraction model layers, in accordance with an exemplary embodiment of the present inventive concept.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and of robotic assistance processing 96.

The exemplary embodiments of the present inventive concept may be a system, a method, and/or a computer program product at any possible technical detail level of integration. The computer program product may include a computer readable storage medium (or media) having computer readable program instructions thereon for causing a processor to carry out aspects of the present inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present inventive concept.

Aspects of the present inventive concept are described herein with reference to flowchart illustrations and/or block diagrams of methods, apparatus (systems), and computer program products according to exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

What is claimed is:

1. A computer-implemented method for providing robotic assistance continuity to a pedestrian using gait recognition, comprising:
    determining, by one or more computer processors, a gait pattern of the pedestrian based on analysis of visual data obtained at a first position;
    providing the pedestrian assistance based on a query provided by the pedestrian at the first position;
    identifying, by one or more computer processors, the pedestrian at a subsequent position by identifying the gait pattern from analysis of visual data obtained at the subsequent position; and
    determining, by one or more computer processors, a need for additional pedestrian assistance at the subsequent position.

2. The method of claim 1, further comprising:
    wherein the identifying the gait pattern includes matching the gait pattern from the first position with a gait pattern from the subsequent position.

3. The method of claim 2, further comprising:
    providing additional pedestrian assistance based on the determined need, wherein the pedestrian assistance provided is directions; and
    updating the directions based on the subsequent position, wherein the updating is performed by at least one robotic device.

4. The method of claim 3, wherein providing the pedestrian assistance and additional assistance is performed by a plurality of robotic devices, wherein at least one robotic device is mobile.

5. The method of claim 4, wherein the visual data is obtained at the subsequent position by a stationary robotic device, and
    wherein the mobile robotic device is deployed to provide the pedestrian with the updated pedestrian assistance.

6. The method of claim 1, further comprising:
    storing the pedestrian query, the provided pedestrian assistance, and the gait pattern; and
    correlating the pedestrian query and the pedestrian assistance with the gait pattern.

7. The method of claim 6, further comprising:
    retrieving the pedestrian interaction and the provided pedestrian assistance based on the matched gait pattern.

8. The method of claim 1,
    wherein the visual data obtained from the subsequent position is analyzed for a situational context, and
    wherein the determining the need for additional pedestrian assistance is based on the situational context.

9. A computer program product for providing robotic assistance continuity to a pedestrian using gait recognition, the computer program comprising:
    one or more computer-readable storage media and program instructions stored on the one or more computer-readable storage media, the program instructions including a method, the method comprising:

obtaining visual data of a pedestrian at a first position;

determining a gait pattern of the pedestrian based on the visual data from the first position;

providing pedestrian assistance based on a pedestrian query at the first position;

obtaining visual data including the gait of the pedestrian at a subsequent position;

determining a gait pattern based on the visual data from the subsequent position;

matching the pedestrian gait pattern from the first position and the subsequent position; and determining a need for additional pedestrian assistance at the subsequent position.

10. The method of claim 9, further comprising:

providing additional pedestrian assistance based on the determined need, wherein the pedestrian assistance provided is directions.

11. The method of claim 10, further comprising:

updating the directions based on the subsequent position, wherein the method is performed by at least one robotic device.

12. The method of claim 11, further comprising:

a plurality of robotics devices, wherein at least one robotic device is mobile.

13. The method of claim 12, wherein the obtaining visual data including the gait of the pedestrian at the subsequent position is performed by a stationary robotic device, and wherein a mobile robotic device is deployed to provide the pedestrian with updated pedestrian assistance.

14. The method of claim 9, further comprising:

storing the pedestrian interaction, the provided pedestrian assistance, and the gait pattern; and correlating the pedestrian interaction and the pedestrian assistance with the gait pattern.

15. A computer system for providing robotic assistance continuity to a pedestrian using gait recognition, the system comprising:

one or more computer processors, one or more computer-readable storage media, and program instructions stored on the one or more of the computer-readable storage media for execution by at least one of the one or more processors, the program instructions including a method comprising:

obtaining visual data of a pedestrian at a first position;

determining a gait pattern of the pedestrian based on the visual data from the first position;

providing pedestrian assistance based on a pedestrian query at the first position;

obtaining visual data including the gait of the pedestrian at a subsequent position;

determining a gait pattern based on the visual data from the subsequent position;

matching the pedestrian gait pattern from the first position and the subsequent position; and determining a need for additional pedestrian assistance at the subsequent position.

16. The method of claim 15, further comprising:

providing additional pedestrian assistance based on the determined need, wherein the pedestrian assistance provided is directions.

17. The method of claim 16, further comprising:

updating the directions based on the subsequent position, wherein the method is performed by at least one robotic device.

18. The method of claim 17, further comprising:

a plurality of robotics devices, wherein at least one robotic device is mobile.

19. The method of claim 18, wherein the obtaining visual data including the gait of the pedestrian at the subsequent position is performed by a stationary robotic device, and wherein a mobile robotic device is deployed to provide the pedestrian with updated pedestrian assistance.

20. The method of claim 15, further comprising:

storing the pedestrian interaction, the provided pedestrian assistance, and the gait pattern; and correlating the pedestrian interaction and the pedestrian assistance with the gait pattern.

* * * * *